United States Patent [19]

Pemberton

[11] Patent Number: 5,384,962
[45] Date of Patent: * Jan. 31, 1995

[54] APPARATUS FOR SHEARING A MATERIAL MASS

[75] Inventor: Walter B. Pemberton, Fern Park, Fla.

[73] Assignee: Pemberton, Inc., Longwood, Fla.

[ * ] Notice: The portion of the term of this patent subsequent to Jul. 6, 2010 has been disclaimed.

[21] Appl. No.: 88,083

[22] Filed: Jul. 6, 1993

Related U.S. Application Data

[63] Continuation-in-part of Ser. No. 871,023, Apr. 20, 1992, Pat. No. 5,224,268.

[51] Int. Cl.6 .................................................. B25F 3/00
[52] U.S. Cl. .................................... 30/134; 30/194; 30/228; 83/609
[58] Field of Search ............. 30/134, 228, 194, 258; 83/609; 184/14

[56] References Cited

U.S. PATENT DOCUMENTS

| | | | |
|---|---|---|---|
| 4,157,020 | 6/1979 | Young | 184/14 |
| 4,198,747 | 4/1980 | LaBounty | 30/134 |
| 4,403,431 | 9/1983 | Ramun et al. | 37/117.5 |
| 4,519,135 | 5/1985 | LaBounty | 30/134 |
| 4,543,719 | 10/1985 | Pardoe | 30/134 |
| 4,558,515 | 12/1985 | LaBounty | 30/134 |
| 4,670,983 | 6/1987 | Ramun et al. | 30/134 |
| 4,686,767 | 8/1987 | Ramun et al. | 30/134 |
| 4,771,540 | 9/1988 | LaBounty | 30/228 |
| 4,776,093 | 10/1988 | Gross | 30/134 |
| 4,802,554 | 2/1989 | Takayama et al. | 184/14 |
| 4,838,493 | 6/1989 | LaBounty | 241/101.7 |
| 4,897,921 | 2/1990 | Ramun | 30/228 |
| 5,146,683 | 9/1992 | Morikawa et al. | 30/134 |
| 5,224,268 | 7/1993 | Pemberton | 30/134 |

Primary Examiner—Richard K. Seidel
Attorney, Agent, or Firm—James H. Beusse

[57] ABSTRACT

A shearing apparatus coupled to an excavator or similar heavy machinery for severing metal structural materials has a fixed blade attached to a boom and a cutting blade pivotably attached to the fixed blade. An outrigger is secured to the fixed blade in a position to support an end of the material during shearing. The outrigger transfers a rotational torque to the fixed blade to urge it toward the movable blade so as to prevent blade separation during shearing.

9 Claims, 5 Drawing Sheets

FIG. 10

APPARATUS FOR SHEARING A MATERIAL MASS

This application is a continuation-in-part of patent application Ser. No. 07/871,023, filed Apr. 20, 1992, now U.S. Pat. No. 5,224,268 issued Jul. 6, 1993.

BACKGROUND OF THE INVENTION

This invention relates to a pneumatically or hydraulically powered metal shearing mechanism and, more particularly, to an improved shearing mechanism adapted for connection to a boom of an excavator or similar machine for in situ severing of metal products.

Conventional powered metal shearing mechanisms or shears have a pivotable and a fixed shear or jaw each with cutting surfaces. The terms "jaw" and "blade" are used interchangeably herein. Typically, the top one of the jaws pivots about a transverse connecting pin and severs material placed between the jaws. Typically applications for these devices are for demolition to clear and reclaim rubble.

A drawback with many devices of this type is that when one jaw is pivoted towards the second jaw to cut the material, the jaws tend to separate in a direction transverse to the direction of shearing. This separation often results in warping, rolling and/or breaking of one of the jaws or the connecting pin, thereby limiting the size and strength of material that can be severed with a particular size of shear as well as detrimentally effecting the life expectancy of a shear which is operated beyond such limits.

Examples of shearing devices that have tried to alleviate shear separation are described in U.S. Pat. Nos. 4,543,719,; 4,558,515, and 4,776,093. These devices attempt to solve the problem associated with shear separation by providing a second parallel, non-cutting jaw adjacent a first non-movable or fixed jaw. The movable jaw crushes the material between the second non-cutting jaw and the fixed jaw. However, a drawback to these devices is that the material may often lodge in between the non-cutting jaw and the adjacent cutting jaw and must later be pushed out resulting in an interruption of the shearing operations. Further, these shearing devices waste available cutting force because the force of the moving shear is directed into deforming or dragging the material mass against or through the non-cutting or second jaw and the first non-movable jaw.

Another drawback to prior shearing devices is that when severing the mass the moveable jaw tends to separate from the first non-moveable cutting jaw. Separation between the shear jaws while cutting may reduce the effective shearing force and may reduce the life expectancy of the shears.

One solution to the aforementioned drawbacks is the shearing device described in Applicant's prior U.S. patent application Ser. No. 07/871,023 filed Apr. 20, 1992. This shearing device has an outrigger attached to a fixed jaw. The outrigger has a surface at a preset angularly spaced relationship to the cutting plane of the fixed jaw so that when the movable jaw engages material laying across the outrigger and the fixed jaw, loading on the outrigger creates a torque on the fixed jaw. The fixed jaw responds to this torque by urging its cutting surface toward the movable jaw.

When shearing certain high-strength materials, it has been found that a welded connection between the outrigger and the fixed jaw is not always of sufficient strength to withstand the shear loading. Consequently, when shearing some thick materials, the outrigger may fail. Furthermore, torque loading on a pivot pin connecting the movable jaw to the fixed jaw may also become unusually severe. As the shears sever a mass, such severe torque loading may result in warping of the connecting pin, thereby reducing the shearing device structural integrity and potentially resulting in pin breakage or shear separation. A reduction in structural integrity also decreases the shearing device effectiveness in severing material.

SUMMARY OF THE INVENTION

An object of this invention is to provide an improved and more efficient shearing device.

Another object of this invention is to prevent shear separation and rolling of the jaws in a single shear head design.

It is a further object of this invention to increase shearing capability with fewer mechanical parts.

It is also an object of this invention to provide a single sided shear head that has a small frontal profile while preventing shear rolling.

A further object of this invention is to cut material with a shearing device without causing shears to separate and without lodging the material being cut between the shears.

It is a further object of this invention to shear with a device that concentrates available cutting force on the workpiece and not on adjacent non-cutting guides.

A further object of the invention is to provide a cutting shear that has an adjustable front profile so that the device may be used in tight areas to shear this material.

Another object of the invention is to sever a material mass with shears, wherein one of which is connected to an outrigger that transfers torque to urge a cutting edge of one of the shears toward the other shear and wherein said outrigger maintains its connection throughout the severing operation.

Also, an object of this invention is to pivot a shear on a pin to sever a material mass while preventing the pin from warping during the severing operation.

The above and other objects are attained with an apparatus for severing a material mass having a fixed or non-pivoting jaw, an outrigger attached to the fixed jaw and a pivoting jaw for severing material against the fixed jaw. In an illustrative form, the apparatus has a fixed jaw with a surface defining a shearing edge and with a receiving cavity. A movable or pivoting jaw has a surface defining a shearing edge and is pivotally coupled to the fixed jaw. An outrigger supports a portion of a material mass when the material mass is being severed. The outrigger has a transverse supporting member with one end extending into the receiving cavity to engage the fixed jaw and extending across the path of travel of the pivoting jaw. The transverse support member has another end connected to a material mass supporting interface with a top surface range in a predetermined angularly spaced relationship with respect to the shearing edge upper surface. The material mass, when severed, exerts torque on the outrigger and the outrigger transfers the torque through the transverse support member to the fixed jaw to urge the shearing edge of the fixed jaw toward the shearing edge of the movable jaw. By extending an end of the transverse support member into the receiving cavity, the outrigger maintains a reliable connection to the fixed jaw throughout the severing operation. Preferably, the movable and fixed jaws rotate about a pin where the pin is supported at one end by a support bracket which is connected to a boom of an excavator or similar equipment to prevent the pin from warping during the severing operation.

BRIEF DESCRIPTION OF THE DRAWINGS

For a better understanding of the present invention, reference may be had to the following detailed description taken in conjunction with the accompanying drawings in which.

DESCRIPTION OF THE PREFERRED EMBODIMENT

Figure 1:
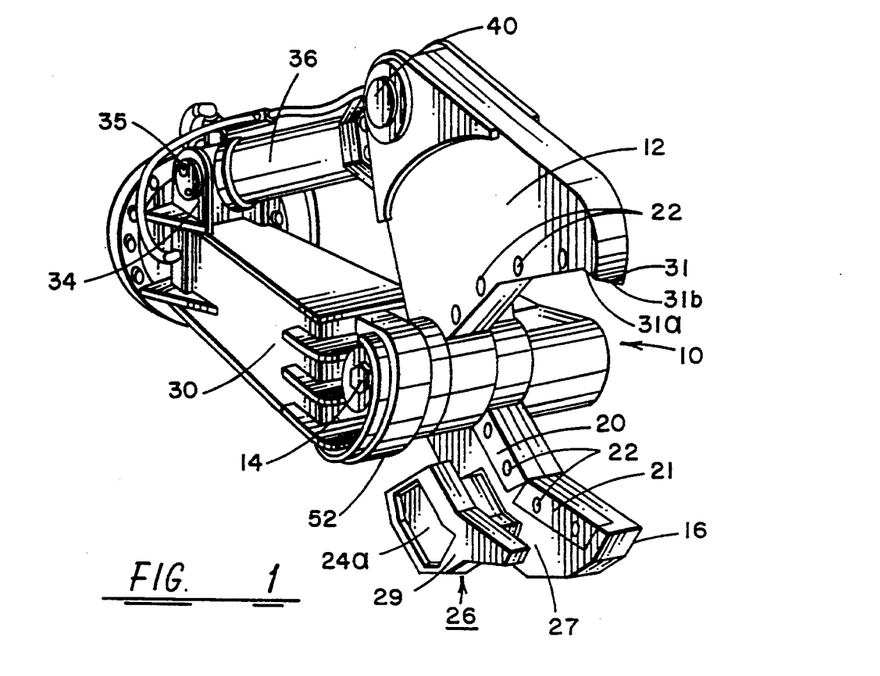
FIG. 1 is a front perspective view of the apparatus for severing a material mass.
Figure 2:
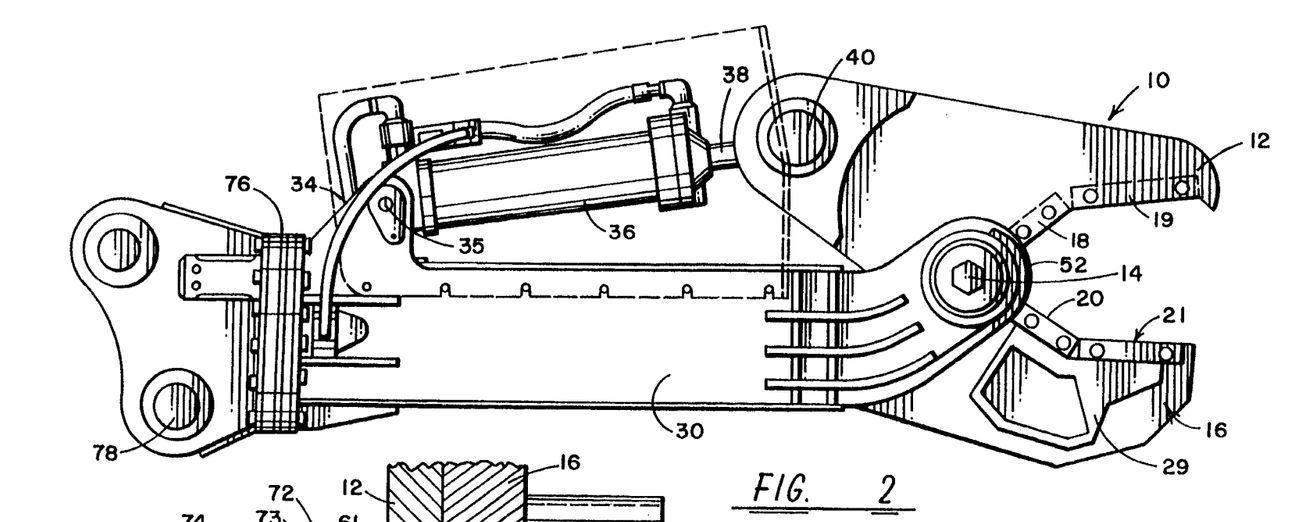
FIG. 2 is a side view of the apparatus shown in FIG. 1.
Figure 3A:
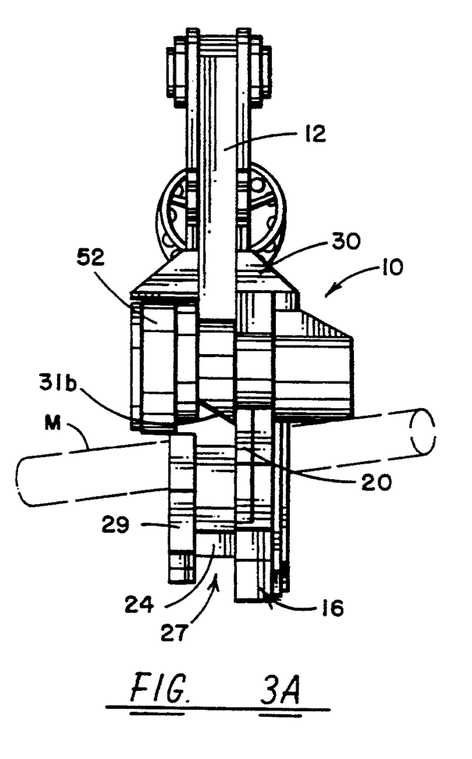
FIG. 3A is a front view of the apparatus shown in FIG. 2 with the shears in an open position.
Figure 3B:
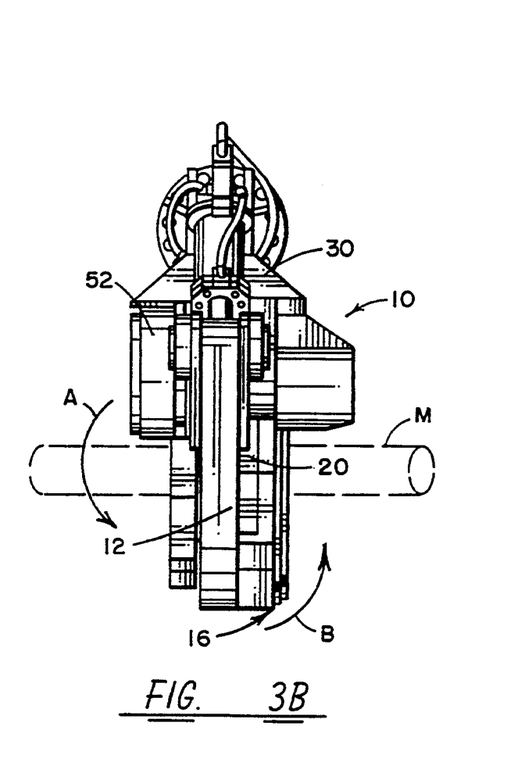
FIG. 3B is a front view of the apparatus with the shears in a closed position.

Referring to FIGS. 1-3, there is shown one form of apparatus 10 in accordance with the teaching of the present invention for severing a material mass M, the apparatus having a movable shear blade or jaw 12 pivotally coupled via a pin 14 to a fixed shear or jaw 16. In FIGS. 1-3, movable jaw 12 and fixed jaw 16 are in a vertical orientation, and pin 14 is shown in a horizontal or transverse orientation. Jaws 12 and 16 have removable cutting or shearing edges 18,19 (FIG. 2) and 20,21, respectively. The jaw 12 pivots about pin 14 to sever a material mass M (FIGS. 3A and 3B). Edges 18 and 19, and edges 20 and 21 have a flat top surface (in planes perpendicular to a vertical plane in FIGS. 3A and 3B) and are disposed at a fixed angular relation to each other to form an apex that forces the material mass M into the apex during a shearing or severing operation. Shearing edges 18–21 are preferably constructed with hardened steel and are removably connected to shears 12 and 16 by conventional techniques, such as by recessed bolts 22.

Figure 9:
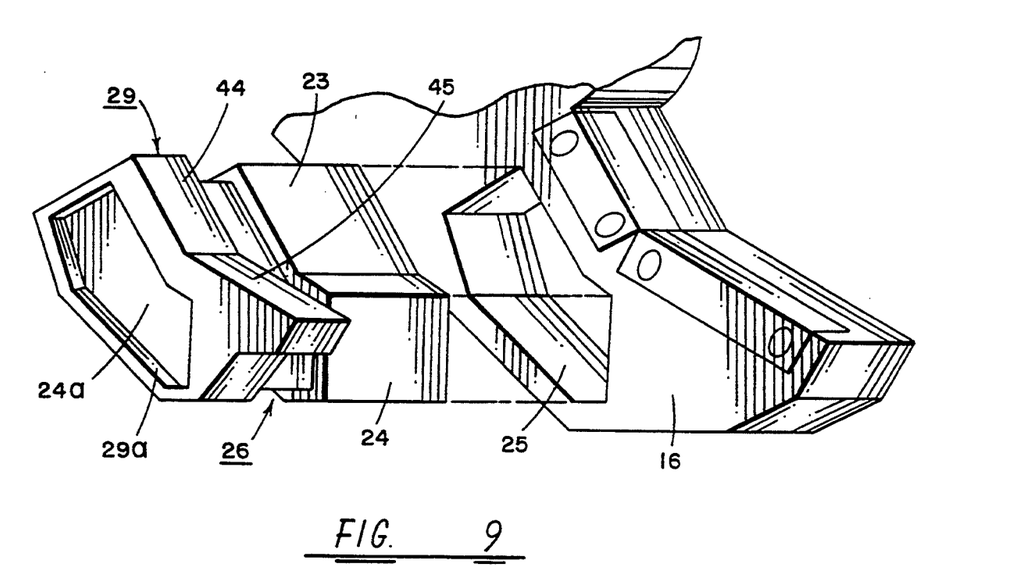
FIG. 9 is an exploded view of the outrigger shown in FIGS. 1 and 2.

Referring to FIGS. 1-3, 8 and 9, there is shown one form of an outrigger 26 for supporting a material mass during a severing or shearing operation. Outrigger 26 includes a vertical support plate 29 integrally connected to a horizontal or transverse support member 24. As best seen in FIG. 9, the plate 29 includes a formed aperture 29a shaped to fit snugly about a formed end 24a of member 24. By mounting plate 29 onto member 24, transverse shear loads are transferred directly to member 24 rather than through an intermediate connection, such as a weld. The plate 29 is held in place on member 24 by welding but the welds do not have to carry the transverse loads.

Transverse support member 24 extends from plate 29 at one end into a cavity 25, formed or machined, within fixed jaw 16. Member 24 may be press-fit into cavity 25 and then welded in place using conventional welding techniques. Insertion of member 24 into cavity 25 also serves to transfer loading directly to jaw 16 and eliminates weld failures which may occur when loading is transferred through intermediate welds. The upper surface 23 of member 24 is shaped with a truncated V shape between plate 29 and jaw 16 so that portions of a material mass being severed are readily discharged and inhibited from being lodged between plate 29 and shear or jaw 16. The depth of cavity 25 is preferably at least half the thickness of fixed shear or jaw 16.

During operation, jaw 12 pivots about pin 14 to sever material mass M placed between jaw 12 and jaw 16. Jaw 12, at full closure with respect to jaw 16, extends into a gap 27 defined by the spacing between outrigger plate 29 and jaw 16 (FIGS. 3A-3B), with the cutting edges 18, 19 overlapping corresponding cutting edges 20, 21. Pivot pin 14 is supported by a boom or structural member 30 which is coupled to a vehicle, such as a excavator 32 (see FIG. 5). Member 30 comprises an aft extension of lower fixed jaw 16, although jaw 16 is preferably attached to member 30 by welding or other suitable means. Member 30 further includes a side support 30a which, in combination with member 30, defines a yoke or clevis design for supporting pin 14. As shown, pin 14 extends through both member 30 and support 30a.

At an end of member 30 distal from pin 14, a flange 34 projects upward. Flange 34 provides a coupling point and support for one end of a hydraulic cylinder 36. The one end of cylinder 36 is pivotably attached to flange 34 by a mounting pin 35. Extending out of the other end of hydraulic cylinder 36 from the flange 34 is a piston 38 which attaches to a pin 40 on movable jaw 12. Hydraulic cylinder 36 is a double acting cylinder in which injection of hydraulic fluid at the one or the other end controls the position of piston 38. Outward movement of piston 38 forces movable jaw 12 to pivot about pin 14 in a closing direction with respect to jaw 16 to shear any material mass between shearing edges 18, 20 and shearing edges 19, 21.

Vertical support plate 29 has a flat supporting top surface with respective top edges 44 and 45 arranged in a predetermined angularly spaced relationship with respect to the top surface of shearing edge 20. When jaws 12 and 16 are in a vertical plane, a straight piece of material, such as mass M, resting on the top surfaces of jaw 16 and outrigger support plate 29 at their respective apexes will preferably be inclined at an angle of 22 degrees with respect to horizontal. Top edges 44 and 45 are preferably spaced below the top surfaces of shearing edge 20 less than the distance across gap 27. An exemplary dimension for gap 27 is 3.5 inches, and the level that the apex of top surfaces 42 and 43 is below the apex of the top surface of fixed shear 16 and is between about 1.5 and 2.0 inches. In general, the gap 27 is approximately the width of movable shear 12 plus about 1.0 inch for clearance.

Before the material mass M is severed, support plate 29 supports the material mass (See FIG. 3A). Referring to FIG. 3B, when the mass M is being severed, jaw 12 pivots downward contacting the material mass M which in turn forces support plate 29 downward (See arrow A). In response to this downward force on support plate 29, torque is transferred from support plate 29 through horizontal support member 24 which creates a turning force on edges 20 and 21 of fixed jaw 16 urging them inward towards movable jaw 12 (See arrow B). In particular, fixed jaw 16 responds to forces from support member 24 by being urged toward movable jaw 12. Thus, the normal tendency of the jaws 12, 16 to separate laterally when shearing a metal mass is counteracted by the loading of the outrigger 26 to impart a torque force on jaw 16 urging it to rotate towards jaw 12.

In addition to the above described system for urging the lower fixed blade cutting edge toward the upper pivotable blade cutting edge, the upper blade 12 is formed with an angled piercing tip 31. The tip 31 is particularly useful when the shears are used for cutting sheet metal material. Referring to FIGS. 1 and 3A, the tip 31 is angled in two directions. The inner surface 31a is angled towards the throat of the shears (towards the pivot point of blade 12) so as to drag material into the shears as blade 12 closes toward blade 16. The outer cutting edge 31b of tip 31 is also angled upward and away from blade 16 so as to urge material in shear toward blade 16. Tip 31 is preferably a replaceable tip similar to a dental cap on a tooth and is formed from a forged and heat treated material. In one form, tip 31 is made from a ripper tooth produced by Caterpillar, Inc. for crushing rock. The angle of the edge 31b may be about thirty degrees with respect to a horizontal plane as seen in FIG. 3A.

Figure 4:
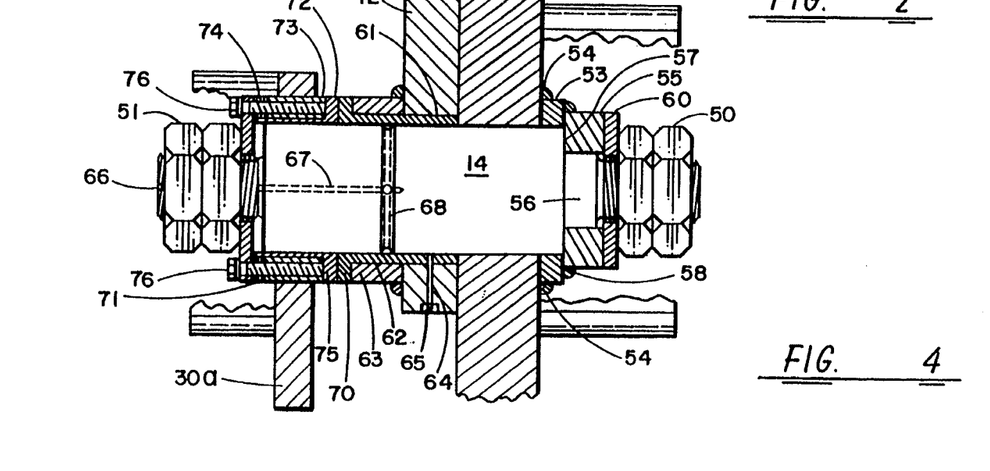
FIG. 4 is a sectional view of pivot along line 4—4 of FIG. 1.

Referring to FIG. 4, there is shown a partial cross-sectional view of the attachment of jaw 12 to jaw 16 at pin 14. The pin 14 is several inches in diameter, e.g., 6–8 inches, with an overall length of from 20–27 inches depending upon the size of shear, i.e., the size of jaws 12, 16 and the intended shearing capacity. Pin 14 is threaded at each end and nuts 50, 51 attached to control the compressive force applied to urge jaw 12 towards jaw 16. Pin 14 is press-fit into an aperture passing through jaw 16 and a first load-spreading washer 53. The washer 53 is welded to jaw 16 as indicated at 54. A bushing 55 fits about a necked down portion 56 of pin 14 and abuts against a shoulder 57 of pin 14. The bushing 55 is welded to washer 53 as shown at 58. The necked down portion 56 is preferably machined into a non-circular shape, e.g., a square cross-section, and the bushing 55 has a mating internal aperture. The bushing 55, being welded to washer 53 which is welded to jaw 16, assures that pin 14 will not rotate within jaw 16 and create any wear that might result in a loose fit between pin 14 and jaw 16. Finally, a washer 60 reacts between bushing 55 and nut 50 to hold pin 14 in position axially, i.e., with shoulder 57 held firmly against bushing 55.

Jaw 12 is intended to rotate about pin 14 and to that end has an oversized aperture 61 in which a bearing sleeve 62 is positioned. The sleeve 62 fits tightly about pin 14 but has grooves (not shown) in which grease is forced to lubricate the interface between the pin and sleeve. In the illustrative embodiment, a bushing 63 also fits about sleeve 62 and is welded to jaw 12. Lubrication is applied to the interface between sleeve 62 and pin 14 by a first channel 64 passing through sleeve 62 and jaw 12 and terminating in a grease fitting 65. Additional lubrication is applied at grease fitting 66 at an end of pin 14, and passes centrally of pin 14 via channel 67 to a transverse channel 68 and then to the interface between pin 14 and sleeve 62.

Lateral pressure is applied against a radially extending flange 70 of sleeve 62 to urge sleeve 62 and jaw 12 against jaw 16. For this purpose, a thrust plate 71 is positioned on pin 14 and held in place by retention nut 51. A bushing 72 and bushing sleeve or housing 73 are placed on pin 14 between plate 71 and sleeve 62. The housing 73 has a plurality of circumferentially spaced, axially oriented threaded apertures extending therethrough. The thrust plate 71 has a plurality of apertures that align with the threaded apertures in housing 73. Shims 74, which may be washers with holes, are placed between plate 71 and housing 73 to position housing 73 in an abutting relationship with radially extending flange 75 on bushing 72. Bolts 76 are then inserted into housing 73 and tightened until a desired pressure is exerted against bushing 72. The housing 73 reacts against thrust plate 71 and the ends of bolts 76 press against flange 75. The pressure is established by torque on the bolts 76 to a preselected value. The fit between pin 14 and sleeve 62 is allowed to have a few thousandths of an inch of clearance to permit a small amount of movement of jaw 16 towards jaw 12 as described with regard to outrigger 26.

Figures 5, 6:
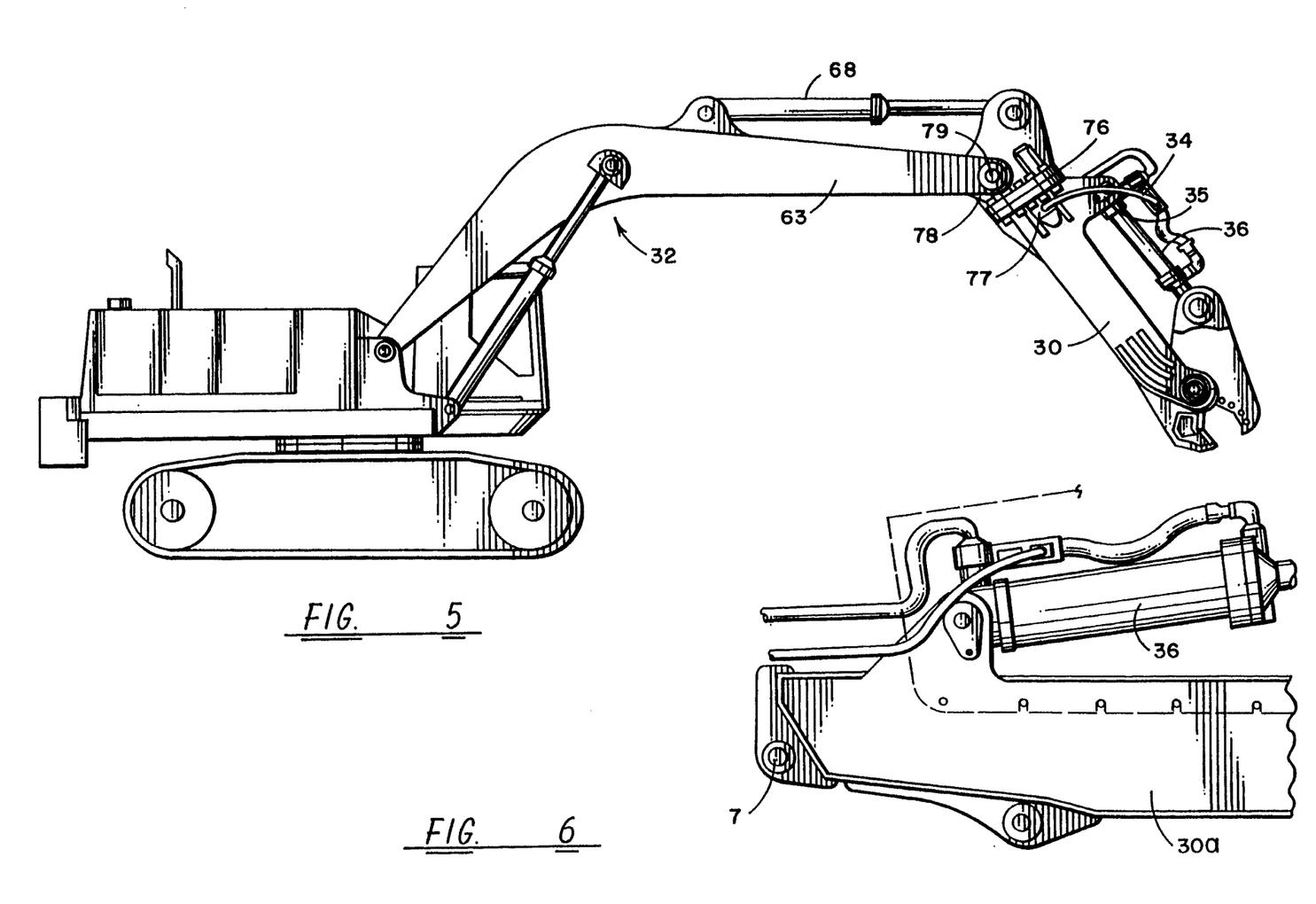
FIG. 5 is a side view of the apparatus for severing a material mass on an excavator and powered by the apparatus' hydraulic cylinder.
FIG. 6 is a side view of a cylinder in an alternate embodiment of a boom which supports the severing apparatus.

Referring to FIG. 5, there is shown one form of the apparatus 10 on an excavator or crawler 32. By conventional means, apparatus 10 may be pivotally connected to a boom 63 of excavator 32 so that its angular position may be adjusted with hydraulic actuator 68. Opening and closing of jaws 12 and 16 are affected with hydraulic cylinder 36 using the techniques previously described. Apparatus 10 is mounted to excavator 32 through a turning device 76 which rotates apparatus 10 about its longitudinal axis, i.e., an axis extending lengthwise of member 30. Turning device 76 includes an outer housing enclosing a gear drive and a hydraulic motor 77. The housing couples the member 30 to an oppositely extending flange or yolk 78 and allows the member 30 to be rotated with respect to yolk 78. The yolk 78 is coupled to boom 63 by a pivot pin 79 and the actuator 68.

Referring to FIG. 6, an alternate embodiment of member 30 is shown in which the turning device 76 is omitted. In this embodiment, pin 79 extends through an extended end 30a of member 30 for attaching member 30 to excavator 32.

Figures 7, 8:
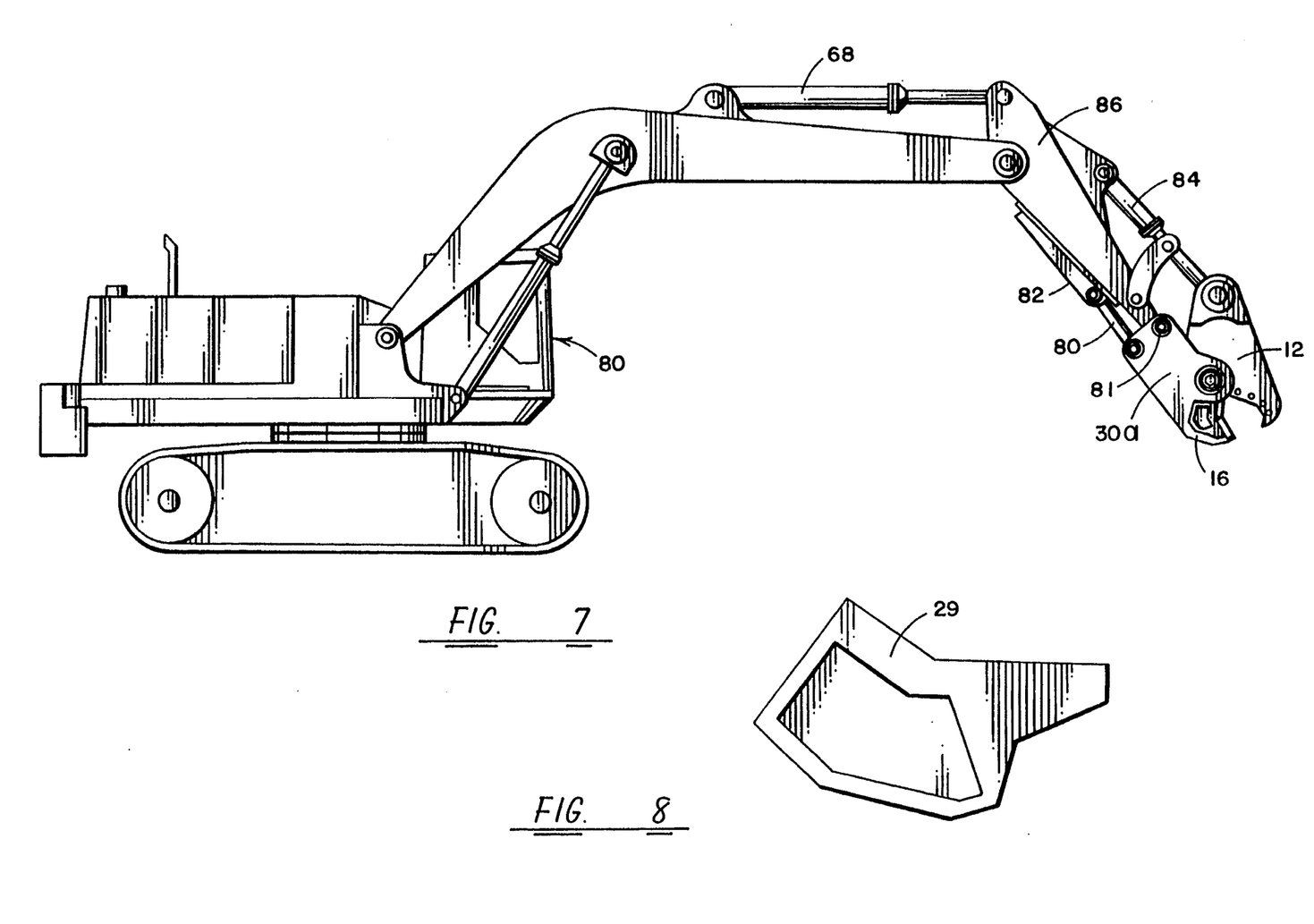
FIG. 7 is a side view of an alternate embodiment of the apparatus for severing a material mass mounted on a back hoe and powered by the excavator's bucket dig cylinder.
FIG. 8 is an enlarged view of the outrigger shown in FIG. 2.

FIG. 7 illustrates still another embodiment eliminating member 30 and using an existing boom segment 86 on an excavator for mounting jaws 12, 16. Lower jaw 16 is coupled to boom segment 86 through a fixed length support 80. The jaw 16 is pinned to member 86 at 81. In this arrangement, the angular position of the lower jaw 16 can be set by use of different length supports 80. It will be recognized that the member 86 in this embodiment may comprise a conventional boom segment on an excavator and that the hydraulic actuators 68 and 84 may comprise actuators on an existing excavator. For example, the excavator may be normally operated with a bucket pinned to member 30 in the position of jaws 12, 16. The jaw 16 is formed with a short extension 30a in place of the longer member 30.

Figure 10:
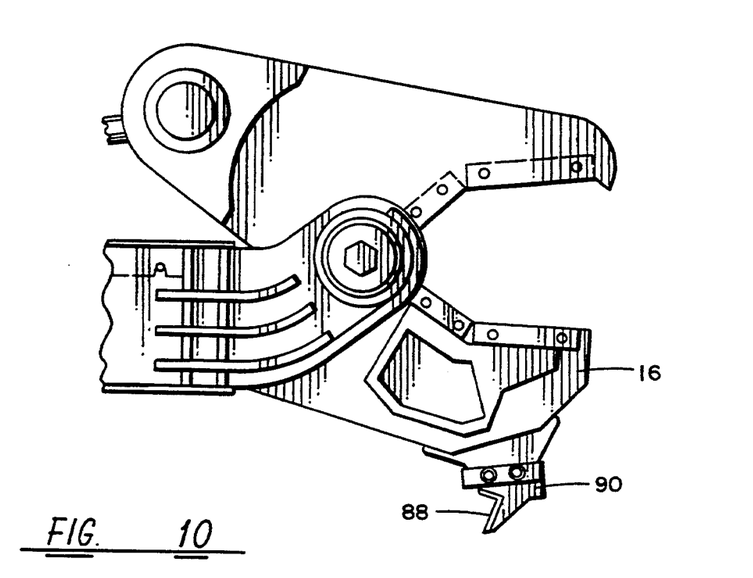
FIG. 10 is a side view of the apparatus for severing a material mass shown in FIG. 1 with a ripper hook attached thereto.

Referring to FIG. 10, there is shown another embodiment of the severing apparatus 10 having a ripper hook 90 which may be connected either to an outer lower edge of outrigger plate 26 or to a lower edge of jaw 16. Ripper hook 90 has a hooked shaped cutting edge 88. The excavator 32 is operative to move hook 90 to puncture a flat plate or similar surface to form an opening for insertion of one of the shear jaws 12, 16.

This concludes the description of the preferred embodiments. A reading by those skilled in the art will bring to mind various changes without departing from the spirit and scope of the invention. It is intended, however, that the invention only be limited by the following appended claims.

What is claimed is:

1. An apparatus for severing a material mass comprising:

a fixed shear blade having a surface defining a shearing edge and further having a receiving cavity formed in said blade spaced from said shearing edge;

a movable shear blade having a surface defining a shearing edge and pivotally coupled to said fixed shear blade to sever the material mass with said fixed shear; and an outrigger for supporting a portion of the material mass during severing of the material mass, said outrigger having a support member extending transverse of said fixed shear blade, a first end of said support member extending into said receiving cavity for attachment to said fixed shear blade, said member extending across the path of travel of said movable shear blade, and having a second end connected to a material mass support plate, a top surface of said support plate being arranged in a predetermined angularly spaced relationship with respect to the shearing edge of said fixed shear blade, the material mass reacting against said support plate to exert a torque during severing onto said outrigger in a direction to create a torque on said fixed shear blade to urge said shearing edge of said fixed shear blade toward said shearing edge of said movable shear blade.

2. The apparatus of claim 1 wherein said fixed shear blade extends a preselected distance aft of said shearing edge for defining a support member for said shearing edge, said movable shear blade including an aft flange overlaying at least part of said support member, a pivot pin extending through said support member and said aft flange for pivotably coupling said movable shear blade to said fixed shear blade, and a side support extending from said support member generally parallel to said aft flange of said movable shear blade for defining a clevis encompassing said movable shear blade, said pin extending through said side support.

3. The apparatus of claim 2 wherein said pivot pin comprises:

a first enlarged diameter section passing through said fixed shear, said movable shear blade and said side support;

a reduced diameter threaded portion on each end of said pin for receiving nuts thereon;

a second reduced diameter section extending between said first section and one of said threaded portions;

bushing means positioned about said second section between said one threaded portion and an adjacent side of said fixed shear blade, said bushing means being welded to said fixed shear blade;

another bushing means positioned about said first portion between said first portion and a circumscribing surface of said movable shear blade, said another bushing means being rotatable conjointly with said movable shear blade about said pin for preventing wear to said movable blade at an interface with said pin; and means extending between said movable blade and another of said threaded portions for urging said movable blade toward said movable blade toward said fixed blade when a nut is placed on said another of said threaded portions.

4. The apparatus of claim 3 and including means for injecting a lubricant between at least part of said bushing means and said pivot pin when said apparatus is in an assembled condition.

5. The apparatus of claim 4 wherein said another bushing means comprises:

a first bushing circumscribing at least a part of said pivot pin between said pin and said movable blade, said first bushing having a radially outward extending annular flange on an end thereof nearest said another threaded portion;

a second bushing circumscribing another part of said pin between said first bushing and said another threaded portion, said second bushing having a radially outward extending annular flange abutting said annular flange on said first bushing;

a sleeve circumscribing said second bushing and generally abutting said annular flange thereof, said sleeve including a plurality of circumferentially spaced, axially oriented threaded apertures extending therethrough;

a thrust plate having a central aperture for fitting onto said another threaded portion of said pin, said plate being arranged to urge said sleeve toward said movable jaw, and having a plurality of apertures alignable with said apertures in said sleeve when said plate and sleeve are in an assembled condition; and a plurality of bolts passing through said apertures in said thrust plate and engaging said threaded apertures in said sleeve, said bolts reacting against said thrust plate and sleeve when ends of said bolts engage said flange of said second bushing for adjustably controlling compression of said movable jaw toward said fixed jaw, said thrust plate being retained by said nut on said another of said threaded portions of said pin.

6. The apparatus as recited in claim 1 further comprising a hook means connected to an outer edge of said fixed shear for puncturing a flat plate.

7. The apparatus of claim 1 and including a piercing tip formed on said pivotable shear blade, said tip having a cutting edge angled diagonally away from said fixed shear blade for urging sheet material toward said fixed blade during a shearing operation.

8. An apparatus connectable to a boom of an excavator for severing a material mass, the apparatus comprising:

a beam connectable to an end of the boom distal from the excavator;

a fixed shear jaw rigidly connected to said beam at a distal end thereof from the boom, said fixed jaw having a surface defining a shearing edge;

a movable shear jaw pivotably connected to said fixed shear jaw, said movable shear jaw having a surface defining a shearing edge;

a pin extending through said jaws transverse to said shearing edges thereof for pivotably connecting said movable jaw to said fixed jaw;

a side support extending from said beam generally parallel to said movable jaw and having an aperture for passage therethrough of said pin, said pin being supported at one end by said fixed jaw and at another end by said side support, with said movable jaw positioned between said fixed jaw and said side support; and an outrigger secured to the fixed shear jaw and having a transverse support plate extending across a path of travel of the movable shear jaw, said outrigger in part supporting the material mass at least during the severing of the mass, said outrigger having a supporting surface arranged in preselected angularly spaced relation with said fixed shear jaw top surface, the material mass exerting a torque during the severing operation onto said outrigger and said outrigger transferring the torque through said transverse support plate to said fixed shear jaw to urge said shearing edge thereof towards said shearing edge of said movable shear jaw.

9. The apparatus as recited in claim 8 further comprising means connected to one end of the pin for adjusting the force urging said fixed shear jaw toward said movable shear jaw.

* * * * *